Feb. 22, 1966   G. L. PARKES ETAL   3,236,545
CAM BUSHING FOR CONDUITS
Filed July 20, 1961   3 Sheets-Sheet 1
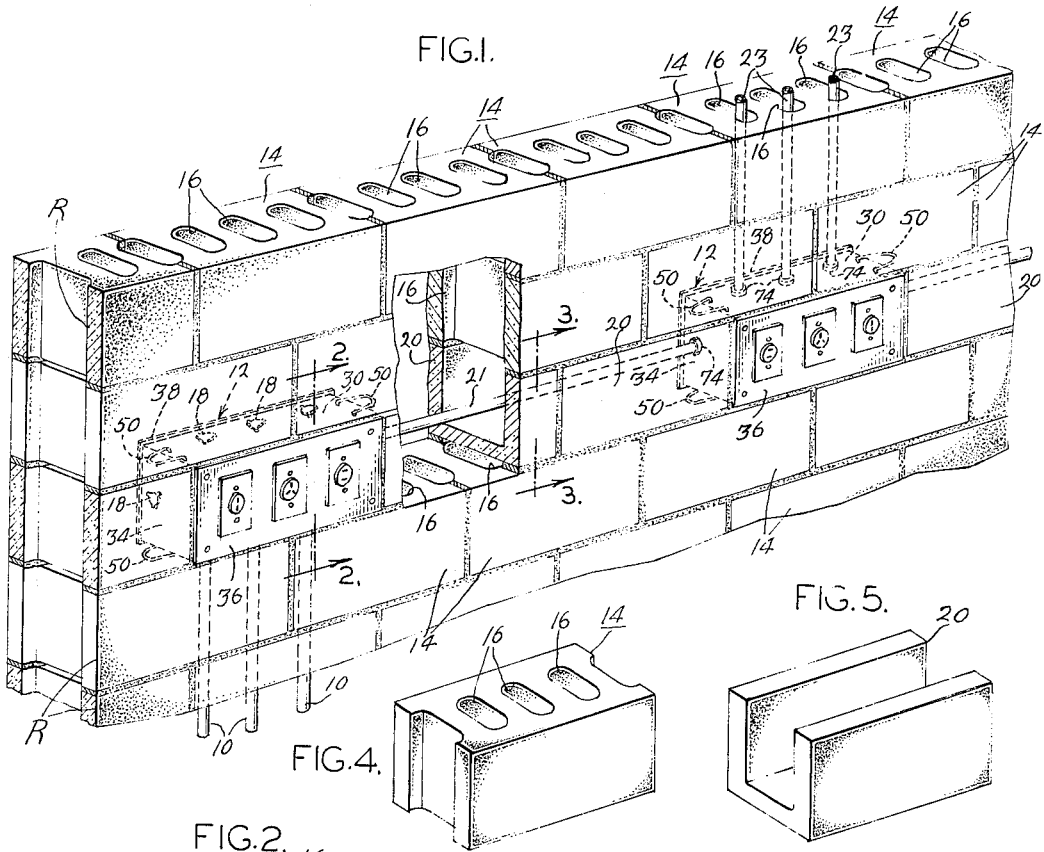
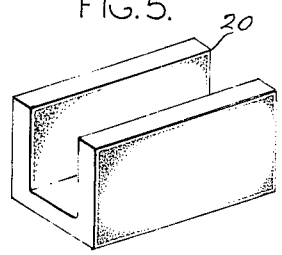
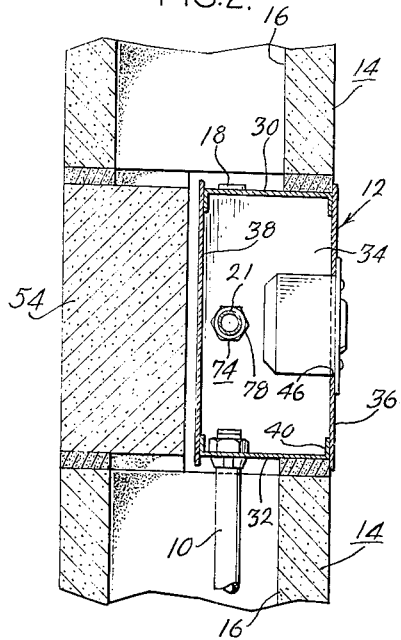
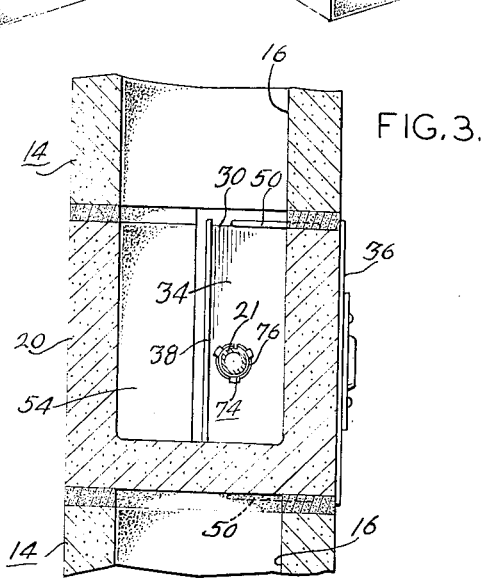
INVENTORS:
PAUL O. DE RAGON
GEORGE L. PARKES
BY Howson & Howson
ATTYS.

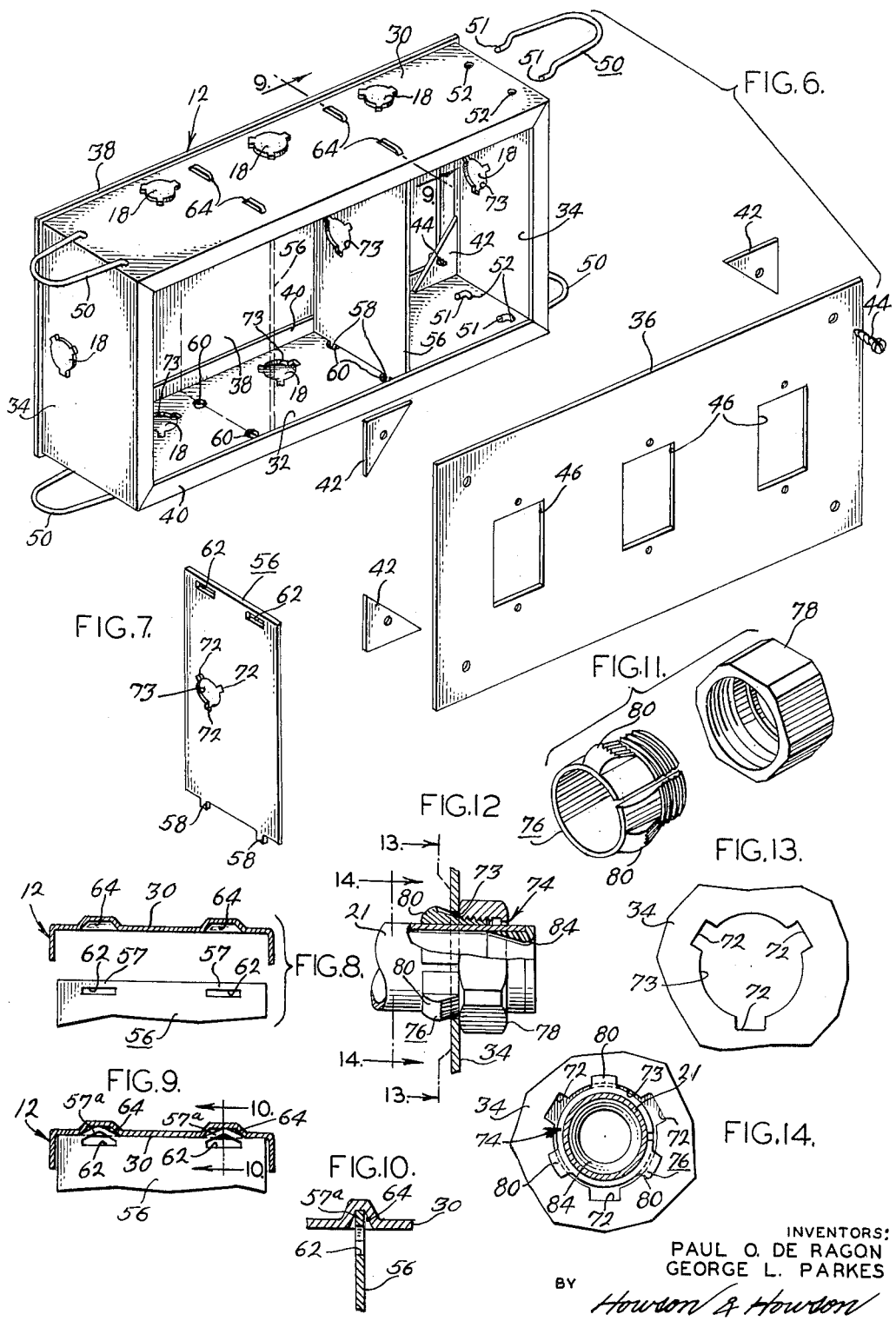

Feb. 22, 1966   G. L. PARKES ETAL   3,236,545
CAM BUSHING FOR CONDUITS
Filed July 20, 1961   3 Sheets-Sheet 3
FIG.15.
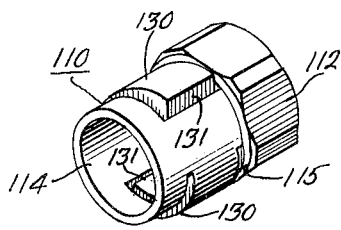
FIG.17.
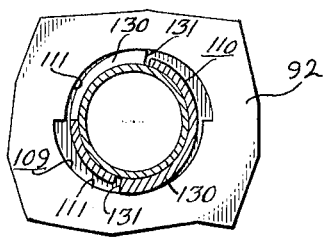
FIG.16.
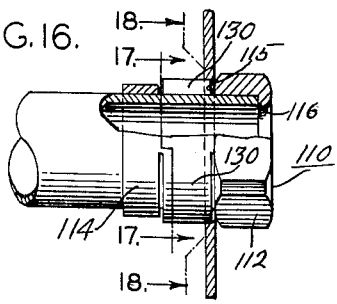
FIG.18.
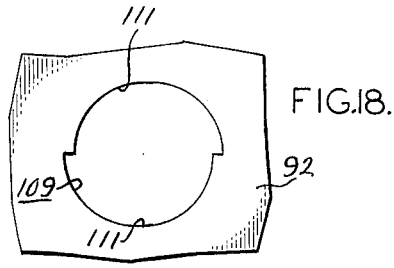
FIG.19.
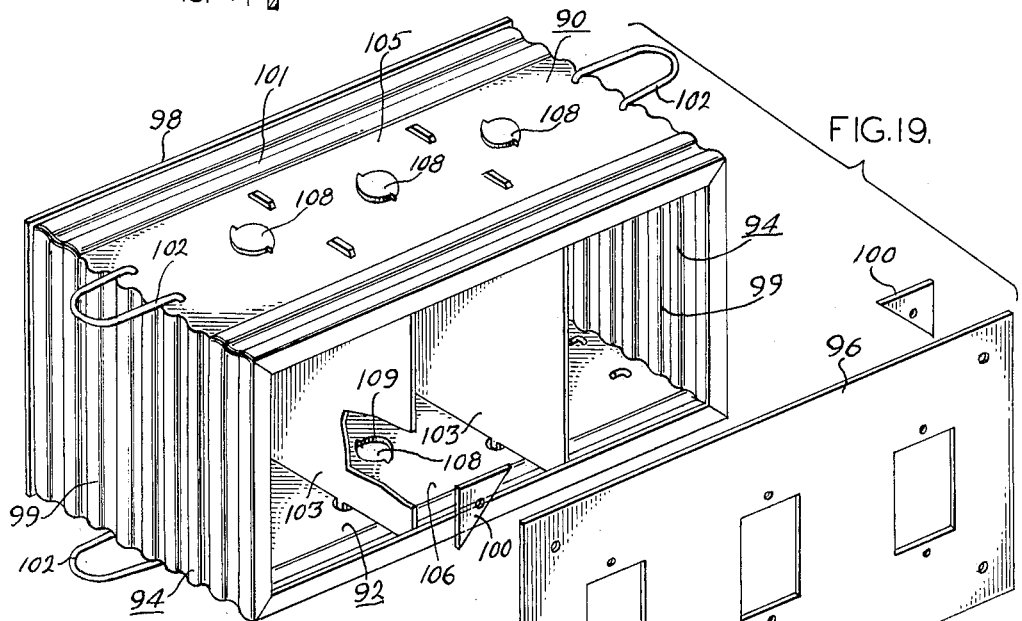
FIG.20.
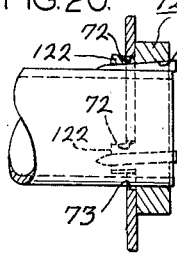
FIG.22.
FIG.21.
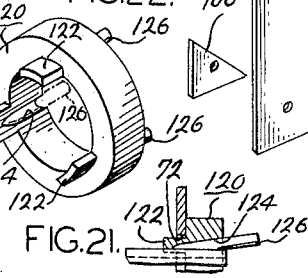
INVENTORS:
PAUL O. DE RAGON
GEORGE L. PARKES
BY Howson & Howson
ATTYS.

United States Patent Office 3,236,545
Patented Feb. 22, 1966

3,236,545
CAM BUSHING FOR CONDUITS
George L. Parkes, Lyon Station, Pa., and Paul O. De Ragon, Sally Ann Manor, Rte. 1, Mertztown, Pa.
Filed July 20, 1961, Ser. No. 125,588
2 Claims. (Cl. 285—215)

This invention relates to installing conduits in concrete block, cinderblock or similar structures and has particular application to a system for electrical wiring and to new and useful improvements in a junction box for installation in the cinderblock structure.

With present architectural trends, it is now common practice to use cinderblock walls as the finished wall structure by simply painting the walls without applying stucco, plaster, wall board or the like. In such structures the conventional wiring and plumbing systems are not entirely satisfactory since the wiring or plumbing is not hidden after completion of the work.

An object of the present invention is to provide a system for installing conduits in cinderblock structures whereby the erection of the structure is greatly simplified and which structure presents a pleasing architectural appearance.

Another object of the present invention is to provide a junction box for installation in a cinderblock structure having novel features of construction and arrangement allowing for installation of the box in the structure in place of a cinderblock or the like and whereby the box is supported in place firmly without employing screw fasteners or the like to secure the box to the surrounding blocks.

A further object of the present invention is to provide a junction box which is of comparatively simplified construction, which is economical to manufacture and which is fully useful for the purposes intended.

A still further object of the present invention is to provide a new and improved connector assembly for securing conduits or the like to a junction box made in accordance with the present invention.

These and other objectives of the present invention and the various features and details thereof are set forth more fully hereinafter with reference to the accompanying drawings, in which:

FIG. 1 is a fragmentary perspective view of a cinderblock structure erected in accordance with system of the present invention;

FIG. 2 is an enlarged sectional view taken along line 2—2 of FIG. 1;

FIG. 3 is an enlarged sectional view taken along line 3—3 of FIG. 1;

FIG. 4 is a perspective view of a conventional type of cinderblock used in the structure shown in FIG. 1;

FIG. 5 is a perspective view of another type of cinderblock used in the structure shown in FIG. 1;

FIG. 6 is an exploded fragmentary perspective view showing the elements of a junction box made in accordance with the present invention;

FIG. 7 is a perspective view of a partition wall adapted to be mounted in the junction box shown in FIG. 6;

FIG. 8 is a fragmentary sectional view showing one edge of the partition wall and the portion of the box to which it is secured;

FIG. 9 is a view similar to FIG. 8 showing the partition wall secured to the box;

FIG. 10 is an enlarged sectional view taken on line 10—10 of FIG. 9;

FIG. 11 is a perspective view of the elements of a connector made in accordance with the present invention;

FIG. 12 is a view partially in section showing the connector of FIG. 11 secured in place in the junction box;

FIG. 13 is a fragmentary view of an opening in the junction box for the connector shown in FIG. 11;

FIG. 14 is a fragmentary plan view showing the connector secured in place in the junction box;

FIG. 15 is a perspective view of another embodiment of connector made in accordance with the present invention;

FIG. 16 is a fragmentary side elevational view partially in section showing the connector of FIG. 15 in place in the wall of a junction box;

FIG. 17 is a sectional view taken on the stepped section line 17—17 of FIG. 16;

FIG. 18 is a fragmentary view of an opening in the junction box for the connector shown in FIG. 15 taken on line 18—18 of FIG. 16, but with the connector removed;

FIG. 19 is an exploded perspective view of another embodiment of junction box made in accordance with the present invention;

FIG. 20 is a side elevational view partially in section of still another embodiment of connector made in accordance with the present invention;

FIG. 21 is a perspective view of the connector shown in FIG. 20; and

FIG. 22 is an enlarged fragmentary sectional view showing the position of one of the pins of the connector prior to assembly.

In the construction of electrically wired cinderblock structures prior to the present invention where the wiring was hidden within the structure, vertical risers were mounted on a foundation or floor supporting the structure to conduct electrical wiring from a source to a junction box in the structure. Thereafter a mason laid cinderblocks in courses in the customary manner over the risers to a predetermined height short of the upper free ends of the vertical risers. At this point in the construction, an electrician installed the junction box and made the necessary connections to secure the box to the risers. Heretofore this was accomplished by trimming the free ends of the risers to accommodate a two-piece connector used to secure the box to the risers and then placing one element of the connector over each of the risers and supporting the element in place while the box was positioned over the risers with the free ends thereof engaging through circular openings in the box. The other element of the connector assembly was inserted over the conduit from the interior of the box and threaded to its mating element thereby fastening the box to the risers. Wiring was then led to the box through the risers and connected to sockets or switch assemblies mounted on the box. Following completion of the electrical work, the mason returned to lay additional courses of cinderblock to complete the structure. It is noted that since the box was not of cinderblock size, it was necessary for the mason to cut or shape blocks to fit around the box which detracted from the symmetry and appearance of the structure. Thereafter screw fasteners or the like were employed to secure the box to the surrounding block or blocks of the structure in order to anchor the box firmly in place.

If additional junction boxes were needed for example, at a higher level in the structure than the first box installed, then it was necessary to again interrupt the work of the mason and install the boxes in the manner described above. Moreover prior to the present invention, where two or more boxes were installed in the structure at a common level, it was the practice to provide vertical risers for each of the boxes to conduct the wiring thereto.

The present invention provides a system for electrical wiring of cinderblock structures wherein the structure may be erected more quickly and economically as compared with the prior method described above. In accordance with the system of the present invention, one or more vertical risers 10 are mounted on a supporting floor or foundation and are made of a suitable length to conduct wiring from a source to one or more junction boxes 12 in the structure. Thereafter conventional cinderblocks 14 of the type shown in FIG. 4 are laid in courses in the customary manner with the usual mortar fill between the rows of blocks R and between adjacent blocks of each row. It is noted that the openings 16 in the blocks facilitate positioning of the blocks over the vertical risers 10. At a predetermined height in the structure, a junction box 12 which is of cinderblock size so that it may be fitted in place in the structure in lieu of a block, is positioned over the terminal ends of the vertical risers and secured to adjoining blocks by means of mortar. The box has knockout plugs 18 which are removable selectively to provide openings in the box to receive the risers. The structure is then completed by laying additional courses of block around the box. By this arrangement, cutting or shaping of cinderblocks to fit the box in place in the structure is obviated thereby simplifying the mason's work. The structure also presents a symmetrical and more pleasing appearance. Moreover the box is maintained firmly in place by means of mortar thereby eliminating the necessity of screw type fasteners of prior constructions.

Another feature of the system of the present invention is the provision of means for connecting junction boxes located at a common level in the structure so that wiring may be led from one box to other boxes in the structure. To this end, a conduit 21 is provided to connect the junction boxes with one another and cinderblocks 20 of U-shaped cross section as shown in FIG. 5 are laid between the junction boxes to facilitate installation of the conduit. By this arrangement, it is only necessary to provide vertical risers from a source to one junction box and the remaining boxes in the structure may be fed from this box by means of interconnecting conduits 21 or additional vertical risers 23 as shown in FIG. 1. This permits the installation of a main panel assembly in a room, with a plurality of separate sub-feeds connected to the main panel assembly, thereby eliminating the necessity for running several separate sub-feed conduits from a remote main panel assembly.

In accordance with the present invention, the junction box has novel features of construction and arrangement whereby it may be installed easily and conveniently in a cinderblock structure. To this end the box includes spaced generally parallel confronting top and bottom walls 30 and 32 which are coextensive in length and of a length approximately equal to the length of a cinderblock and spaced parallel side walls 34 of a height approximately equal to the height of a cinderblock connecting the top and bottom walls at their outer ends. In the present instance the depth of the box is approximately half that of the conventional cinderblock and accordingly a filler block 54 as illustrated in FIG. 2 may be employed to fill the void in the structure. By this construction, it is not necessary to size blocks to fit the box in place in the structure and accordingly the symmetry of the structure is not disrupted and the structure presents a pleasing architectural appearance.

In order to firmly anchor the box in place, generally U-shaped clips 50 may be provided which have offset terminal end portions 51 engageable in openings 52 in the top and bottom walls so that they project outwardly therefrom approximately in the plane of the top and bottom walls as illustrated in FIG. 6. The clips engage in the mortar fill between the rows of blocks as shown in FIG. 1 to anchor the box firmly in place. Accordingly the box may be easily and conveniently installed in a cinderblock structure and supported firmly in place without the use of screw fasteners to secure the box to adjacent blocks of the structure.

Generally rectangular front and rear panels 36 and 38 are detachably secured to the open front and rear portions of the box respectively. In the present instance this is accomplished by means of triangularly shaped toggle blocks 42 which engage at the corners of the box, the inner surface of an inwardly projecting peripheral lip 40 on the opposite side edges of the top, bottom, and side walls and screw fasteners 44 which engage through openings in the panels and toggle blocks 42 to thereby secure the panels in place. As shown the front panel 36 of the box may be provided with one or more openings 46 to accommodate a switch plate or socket assembly. It is noted that the front panel 36, for example, may be secured to and removed from the box after it has been installed in a cinderblock structure thereby permitting access to the interior of the box for making electrical connections or adjustments when it is desired. The exposed surfaces of the front and/or rear panels may be textured to simulate the surface of the cinderblock and thereby enhance the architectural appearance of the cinderblock structure in which it is mounted.

Another feature of the junction box of the present invention is the provision of one or more partitions 56 which are insertable selectively in the box to divide the interior thereof into sections. This permits the box to be used for different types of circuits, for example both electrical and telephone circuits. In the present instance the partitions 56 are of generally rectangular shape having spaced projections or tabs 58 depending from the bottom edge thereof which are engageable in openings 60 in the bottom wall 32 of the junction box to locate the partition 56 with respect to the bottom wall. The partition 56 is secured to the top wall 30 of the junction box by providing a pair of spaced slotted openings 62 adjacent the top edge of the partition forming thin wall sections 57 which are deformable to provide outward projections 57a as shown in FIG. 9 engageable in recesses 64 in the top wall of the junction box. The thin wall section 57 of the partition may be deformed, for example, by inserting a tool such as a screw driver therein and then rotating the tool when the top edge of the partition 56 is approximately aligned with the recess 64 in the top wall of the box. By this arrangement, the electrician or other workman may complete the work of connecting conduits or other leads in the box without the nuisance of obstructing partitions, and after this work has been completed, install the partitions. Additionally only those partitions which are necessary need be inserted in the box.

Another feature of the present invention is the provision of a connector assembly having novel features of construction and arrangement whereby the risers may be connected to the box 12 easily and quickly after erection of the structure and installation of the boxes, risers and/or conduits therein. To this end a plurality of knockout plugs 18 are provided, in the present instance in the top, bottom and side walls of the box which are selectively removable to provide openings 73 in the walls for conduits or risers. The openings 73 as illustrated are generally circular in form having three circumferentially spaced radially extending cutout portions 72 and are preferably greater in cross section than the outer diameter of the conduit to permit interposition of a connector 74 to secure the end of the conduit to the box. The connector 74 shown in FIG. 11 is a two-piece connector and comprises a split collar member 76 which is threaded at one end to receive an internally threaded nut 78. The collar 76 has at its opposite end in the present instance three circumferentially spaced radially outwardly projecting ribs 80. Each of the ribs 80 has an inclined outer surface which converges toward the threaded end of the collar.

The connector is utilized to secure the outer end of a conduit extending through an opening 73 to a wall of the box 12 by sawing off the end of the conduit and then positioning the collar 76 over the outer end of the conduit through the opening 73. It is noted that the ribs 80 of the collar are circumferentially spaced apart a distance equal to the spacing between the cutouts 72 to allow for insertion of the collar through the opening. Thereafter the collar 76 is rotated slightly so that the ribs 80 are staggered with respect to the radial cutouts 72 and engage under the marginal edge of the opening 73. The threaded nut 78 is then inserted over the end of the conduit, threaded onto the collar and drawn up tight. This draws the ribs 80 into gripping contact with the wall of the box as shown for example in FIG. 12 which in turn compresses the collar radially to grip the conduit. If desired, a bushing 84 made of a plastic material or the like may engage the end of the conduit to prevent wiring from contacting the rough sawed edges of the conduit. By this arrangement, the mason's work is not interrupted to allow for the connection of conduits and outlet assemblies to the box since this can be done after completion of the structure.

Another embodiment of the connector in accordance with the present invention adapted to be used with a junction box having conduit openings of the type shown in FIG. 13, is shown in FIGS. 20–22. The connector comprises a collar member 120 having in the present instance circumferentially spaced lugs 122 depending from the bottom face thereof. Three axially extending grooves 124 are provided on the interior surface of the collar 120 which as illustrated are aligned with the lugs 122 and converge inwardly toward the bottom face of the connector. A pin 126 is mounted in each of the slotted grooves 124 and is detachably retained therein for example by means of a suitable adhesive or a tack weld. The pins 126 as illustrated project from the top face of the collar prior to assembly of the connector.

The connector is utilized to secure the outer end of a conduit or the like to a wall of a box of the type illustrated for example in FIG. 7. With the conduit extending into the box through the opening 73 the collar 120 is positioned over the outer end of the conduit through the opening 73. It is noted that the lugs 122 engage through the cutout portions 72 of the opening and the bottom face of the collar abuts the marginal edge of the opening. The pins are then driven in an axial direction towards the lugs 122 and due to the tapered grooves, the pins are urged inwardly towards the conduit and grip the conduit to anchor it with respect to the connector. The pins 126 also force the lugs radially outwardly to thereby secure the collar with respect to the wall of the box. Thereafter the conduit and projecting portions of the pins may be trimmed flush with the top face of the collar.

Another embodiment of junction box in accordance with the present invention is shown in FIG. 19. The box illustrated is generally similar in arrangement to that of the previously described embodiment and includes top and bottom walls 90 and 92 of cinderblock length, side walls 94 of cinderblock height and front and rear panel members 96 and 98 which are removably secured to the front and rear end of the box respectively by means of toggle blocks 100 and screw fasteners as described above. The box also includes detachable support clips 102 for anchoring the box to the mortar and partitions 103 which are selectively insertable in the box in the manner described above.

In accordance with this embodiment of the invention, the depth of the box is approximately the depth of a conventional cinderblock of the type shown for example in FIG. 4 so that when it is positioned in a cinderblock structure, the front and rear panels of the box are approximately flush with the opposite sides of the structure. Additionally, the top, bottom and side walls of the box are corrugated to provide greater stiffness and also a better interlock with the mortar. In the present instance the corrugations run lengthwise of the top, bottom, and side walls of the box and for the full depth of the side walls as at 99. The top and bottom walls are corrugated adjacent their outer side edges as at 101, to provide substantially planar center portions 105 and 106 respectively. By this construction there is provided a structural unit of sufficient strength to replace a portion of the wall in which it is used without thereby weakening the wall.

In accordance with this embodiment of the invention, one or more knockout plugs 108 are provided in the planar sections 105 and 106, each of which is selectively removable to provide an opening 109 which as illustrated in FIG. 18 consists of offset, half-moon sections 111. The smallest diametrical dimension of the opening 109 is greater than the outer diameter of the conduit to the box. The connector 110 as illustrated in FIG. 15 comprises a wrench-receiving portion 112 and a generally tubular portion 114 of a reduced diameter depending therefrom to provide a shoulder 115. In the present instance the wrench-receiving portion 112 has an inwardly projecting peripheral lip 116 at its free end adapted to engage over the outer end of the conduit to prevent wiring from contacting the rough edges of the conduit. The tubular portion 114 as illustrated in FIG. 15 has two arcuate wedge-shaped leaves 130 which in the present instance are diametrically opposed and which project beyond the outer peripheral surface of the tubular portion. The leaves 130 as illustrated in FIG. 15 are gradually tapered toward their free and 131 whereby the cross section through the leaves is of generally the same configuration as the opening 109. Accordingly the tubular portion of the connector may be freely received in the opening 109.

In order to secure the conduit to the wall of the box, the connector is positioned over the terminal end of the conduit. Thereafter the connector is rotated with respect to the wall of the box, in the present instance, in a counterclockwise direction with respect to FIG. 17. This rotation results in a camming acting between the leaves 130 of the connector and the opening 109, in turn, pressing the leaves 130 radially inwardly to grip the conduit and secure it with respect to the box. It is noted that the connector is located with respect to the conduit by engagement of the lip 116 with the outer end of the conduit and therefore it is not necessary that the shoulder 115 engage the face of the box illustrated in FIG. 16. To this end the leaves are formed with an enlarged axial dimension so that the conduit need not be trimmed to provide a precise fit.

From the foregoing, it is apparent that the present invention provides a novel system for electrical wiring of cinderblock structures and a junction box for installation in the structure having novel features of construction and arrangement whereby the installation of the box in the structure is greatly simplified. Additionally, the present invention provides novel connector means for securing conduits and the like quickly and easily to the junction box.

The foregoing description has been made with particular reference to electrical wiring, but the system of the present invention is equally applicable to plumbing, particularly since the relatively large size of the box is able to accommodate valves, shutoffs, bleeders and the like as well as the usual pipe junctions.

While particular embodiments of the present invention have been illustrated and described herein, it is not intended to limit the invention to these embodiments and changes and modifications may be made therein within the scope of the following claims.

We claim:
1. A connector for securing a conduit or the like engageable through an opening in a wall of a junction box or the like, the wall being of a given thickness and the opening therein being generally circular and having at least one offset half-moon section, comprising a wrench receiving portion, a tubular portion of reduced diameter depending from said wrench receiving portion defining an annular shoulder at the juncture with said wrench receiving portion, said tubular portion having at least one circumferentially extending arcuate wedge-shaped leaf struck out from the tubular portion and projecting from the outer peripheral surface thereof and being flexible to permit limited radial displacement thereof, said leaf being tapered toward its free end having one circumferential edge disposed adjacent said annular shoulder and separated therefrom a distance less than the thickness of the wall of the box, said leaf having an axial width greater than the thickness of the wall of the box, said connector benig adapted to be positioned over said conduit through the opening with the wrench receiving portion disposed interiorly of the box with said annular shoulder engaging the wall of the box adjacent the opening and said leaf confronting the marginal edge of the opening in the box whereby rotation of said connector with respect to the opening effects engagement of said leaf with said marginal edge of the opening in the box and displacement of the leaf radially inwardly to grip the conduit and secure it to the wall of the box.

2. A connector for securing a conduit or the like engageable through an opening in a wall of a junction box or the like, the wall being of a given thickness and the opening being generally circular and having a pair of diametrically opposed offset half-moon sections, comprising a wrench receiving portion, a tubular portion of reduced diametre depending from said wrench receiving portion defining an annular shoulder at the juncture with said wrench receiving portion, said tubular portion having a pair of diametrically opposed circumferentially extending arcuate wedge-shaped leaves stuck out from the tubular portion and projecting from the outer peripheral surface thereof, each said leaf being flexible to permit limited radial displacement thereof and each said leaf being tapered toward its free end having one circumferential edge disposed adjacent said annular shoulder and separated therefrom a distance less than the thickness of the wall of the box, each said leaf having an axial dimension greater than the thickness of the wall, said connector being adapted to be positioned over said conduit through the opening with the wrench receiving portion disposed interiorly of the box with said annular shoulder engaging the wall of the box adjacent the opening and said leaves confronting the marginal edge of the opening in the box whereby rotation of said connector with respect to the opening effects engagement of said leaves with said marginal edge of the opening in the box and displacement of the leaves radially inwardly to grip the conduit and secure it to the wall of the box.

References Cited by the Examiner

UNITED STATES PATENTS

| | | | |
|---|---|---|---|
| 377,988 | 2/1888 | Bowers | 285—394 |
| 682,215 | 9/1901 | Mauer et al. | 285—215 |
| 710,488 | 10/1902 | Mauer et al. | 285—395 |
| 982,535 | 1/1911 | Rudkiewicz | 285—128 X |
| 1,101,963 | 6/1914 | Rosenfeld | 285—322 |
| 1,131,399 | 3/1915 | McGinley | 174—65 |
| 1,224,269 | 5/1917 | Broadbent | 285—322 |
| 1,327,292 | 1/1920 | Raymond | 50—356 |
| 1,481,062 | 1/1924 | Johnson | 285—358 |
| 1,524,146 | 1/1925 | Murray | 50—263 |
| 1,644,310 | 10/1927 | Strongson | 285—394 X |
| 1,744,171 | 1/1930 | Lane | 50—356 |
| 1,793,113 | 2/1931 | Metcalf | 285—323 |
| 1,796,064 | 3/1931 | Swanson | 285—323 |
| 1,811,200 | 6/1931 | Kainer | 285—362 X |
| 1,836,408 | 12/1931 | Sutton | 50—127 |
| 1,902,229 | 3/1933 | Goetzelman | 285—208 |
| 2,480,522 | 8/1949 | Tornblom | 285—128 |
| 2,514,504 | 7/1950 | Moline | 285—162 |
| 2,528,180 | 10/1950 | Roehl | 285—158 |
| 2,611,500 | 9/1952 | Martin. | |
| 2,708,122 | 5/1955 | Clark | 285—128 |
| 2,930,504 | 3/1960 | Hudson. | |

FOREIGN PATENTS 17,437    7/1914    Great Britain.

CARL W. TOMLIN, *Primary Examiner.*

JACOB L. NACKENOFF, *Examiner.*